Figure 1:
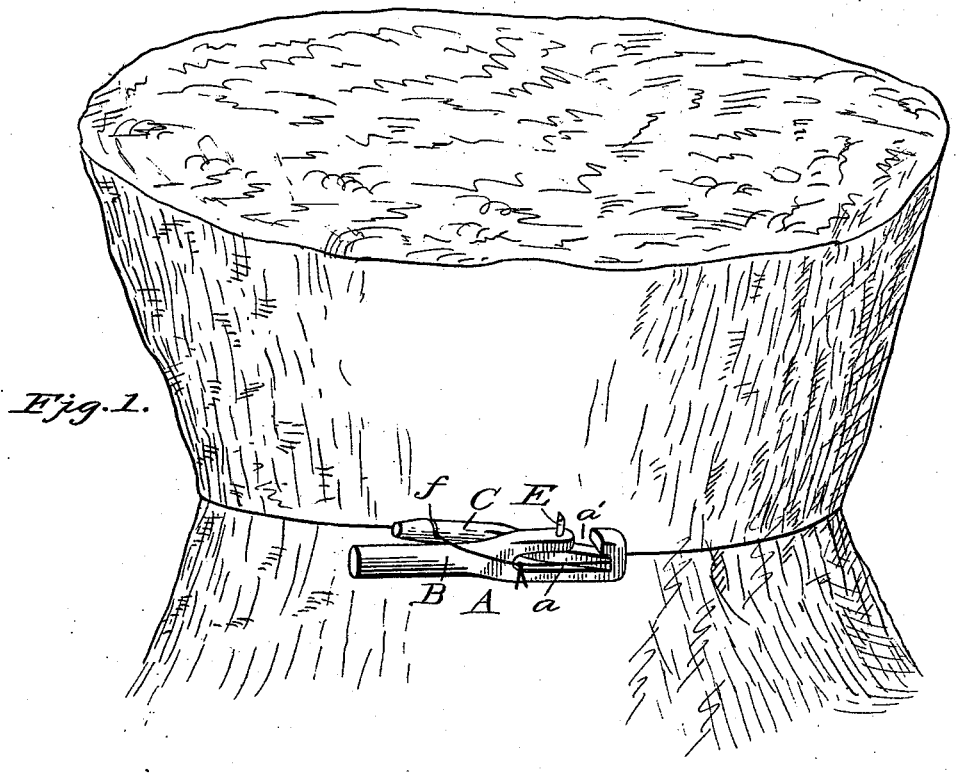

(No Model.)

B. H. LONG.
SHOCK COMPRESSOR.

No. 553,962. Patented Feb. 4, 1896.

Witnesses
Edwin G. McKee,
A. E. Hall

Inventor
Benton H. Long.
John Wedderburn
Attorney

UNITED STATES PATENT OFFICE.

BENTON HARRISON LONG, OF PALO, IOWA.

SHOCK-COMPRESSOR.

SPECIFICATION forming part of Letters Patent No. 553,962, dated February 4, 1896.

Application filed October 25, 1895. Serial No. 566,915. (No model.)

*To all whom it may concern:*

Be it known that I, BENTON HARRISON LONG, a citizen of the United States, residing at Palo, in the county of Linn and State of Iowa, have invented certain new and useful Improvements in Shock-Compressors; and I do hereby declare the following to be a full, clear, and exact description of the invention, such as will enable others skilled in the art to which it appertains to make and use the same.

This invention relates to certain new and useful improvements in devices for bundling corn-shocks, cotton-bales, or other bundles or packages; and it has for its objects among others to provide a simple and light and cheap implement which may be carried in the pocket for ready use in the field or other place and by the use of which the bundle may be quickly and easily tied.

The device embodies a handle with a lever pivoted in an opening therein and having a notch to receive the cord or twine employed, and a knife is also provided for cutting the cord or twine after the bundle has been tied. This knife may, in one of the forms of the invention, be a part of the pivot of the lever, which pivot is extended and shaped into the knife. It will be observed that the grip is attached to the cord or twine itself and the compression is done by the said cord or twine while the grip holds the same until it is tied.

Other objects and advantages of the invention will hereinafter appear and the novel features thereof will be specifically defined by the appended claims.

The invention in this instance resides in the peculiar construction of the implement, as will be more fully hereinafter described, shown in the drawings and then particularly pointed out in the claims.

The invention is clearly illustrated in the accompanying drawings, which, with the letters of reference marked thereon, form a part of this specification, and in which—

Figure 2:
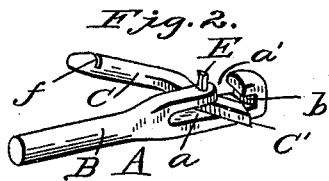
Figure 3:
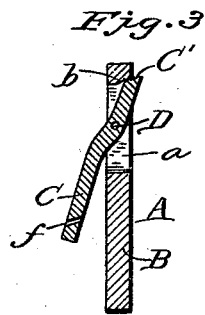

Figure 1 is a perspective view of my improvement shown as in use. Fig. 2 is a view of the implement itself. Fig. 3 is a longitudinal section through the same.

Like letters of reference indicate like parts throughout the several views.

Referring now to the details of the drawings by letter, A designates the body portion of the device, having a handle portion B and a longitudinal slot $a$ open upon one side, as at $a'$.

C is an arm or lever pivoted between its ends within the said slot upon a pivot D, which is held in the opposite walls of the slot, and one end of this pivot is extended beyond the body portion and shaped to form a cutter or knife E. The end of the short arm of this lever is preferably serrated or roughened, as seen at $C'$, and the coacting part of the body portion may be likewise serrated or roughened, as seen at $b$. The arm or lever C is provided with a notch $f$, as shown, near its free end for the reception of the cord or string.

In practice the implement is applicable to the tying of any and all bundles that require a string or the like to be held tight while the same is being tied in a knot. The device is attached to the string or cord, as shown in Fig. 1, and holds the same with a sure grip until the knot or fastening is made, when it is easily removed by taking hold of the handle and pulling it out a little and removing the twine or cord from the notch in said handle or lever. The string may be easily cut by the knife or cutter.

Modifications in detail may be resorted to without departing from the spirit of the invention or sacrificing any of its advantages. I may sometimes place the knife or cutter in the short end of the lever. I may construct the implement of metal or wood or of a combination of these two materials.

What is claimed as new is—

1. The corn-shock compressor herein described, comprising the body portion having a handle and a longitudinal slot open at one side and an arm pivotally mounted between its ends within said slot and provided near its free end with a transverse slot, substantially as and for the purpose specified.

2. The corn-shock compressor herein described, comprising the body portion having a handle and a longitudinal slot open at one side and an arm pivotally mounted between its ends within said slot and provided near its free end with a transverse slot, the pivot of the lever being extended at one end to form a cutter, substantially as shown and described.

In testimony whereof I have signed this specification in the presence of two subscribing witnesses.

BENTON HARRISON LONG.

Witnesses:
PETER LONG,
WEBB C. WRIGHT.